US012746981B2

(12) United States Patent
Harmon et al.

(10) Patent No.: US 12,746,981 B2
(45) Date of Patent: Sep. 29, 2026

(54) MODULAR BED RAIL SYSTEM

(71) Applicant: Ford Global Technologies, LLC, Dearborn, MI (US)

(72) Inventors: Michael John Harmon, Northville, MI (US); Kendra Marie Rabineau, Berkley, MI (US); John Galin, Mill Valley, CA (US); Andrew Gombac, Detroit, MI (US); Stephen Moneypenny, San Diego, CA (US); Eva Ross, Hermosa Beach, CA (US); Christine Zhou, Diamond Bar, CA (US); Javor Gnjidic, Costa Mesa, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 263 days.

(21) Appl. No.: 18/640,377

(22) Filed: Apr. 19, 2024

(65) Prior Publication Data

US 2025/0326443 A1 Oct. 23, 2025

(51) Int. Cl.
*B62D 33/02* (2006.01)

(52) U.S. Cl.
CPC ................................ *B62D 33/0207* (2013.01)

(58) Field of Classification Search
CPC ... B60R 11/00; B60R 11/06; B60R 2011/004; B60R 2011/0084; B60R 2011/005; B60R 13/01; B60R 9/00; B62D 33/02; B62D 33/0207; B60P 7/0815
USPC ........ 296/3, 36, 37.6, 136.06; 224/325, 321, 224/403, 404
See application file for complete search history.

(56) References Cited

U.S. PATENT DOCUMENTS

| | | | | | |
|---|---|---|---|---|---|
| 5,584,521 | A | | 12/1996 | Hathaway et al. | |
| 5,620,124 | A | * | 4/1997 | Geier | B60P 7/0815 224/539 |
| 5,927,783 | A | | 7/1999 | Baka | |
| 6,464,276 | B1 | * | 10/2002 | Gruich | B62D 33/0273 224/403 |
| 9,868,403 | B2 | * | 1/2018 | Pulleyblank | B60R 9/06 |
| 10,800,465 | B2 | * | 10/2020 | Schuling | B60R 9/06 |
| 10,829,059 | B1 | * | 11/2020 | Addison | B60P 1/433 |
| 11,072,294 | B2 | * | 7/2021 | Fehr | B60R 9/10 |
| 11,654,978 | B2 | * | 5/2023 | Smith | B60R 9/06 224/405 |
| 12,485,830 | B2 | * | 12/2025 | Dexter | B60R 9/06 |
| 2009/0242714 | A1 | * | 10/2009 | Verhelst | B60R 9/10 248/227.2 |

(Continued)

FOREIGN PATENT DOCUMENTS

WO 2024013629 A1 1/2024

*Primary Examiner* — Corey N Skurdal
(74) *Attorney, Agent, or Firm* — Vichit Chea; Carlson, Gaskey & Olds, P.C.

(57) ABSTRACT

A system includes a first rail extendable along a first side wall defining a cargo area and a second rail extendable along a second side wall defining a cargo area, wherein the first rail and the second rail each define a channel that is closed at one end by a base surface and is open to the cargo area at an opposite end. A plurality of accessories are selectively mountable to at least one of the first rail and the second rail, wherein each accessory has a common base structure that is received within the channel.

19 Claims, 6 Drawing Sheets

(56) References Cited

U.S. PATENT DOCUMENTS

| | | | |
|---|---|---|---|
| 2020/0062094 | A1 | 2/2020 | Xu |
| 2021/0138955 | A1 | 5/2021 | Puchkoff |

* cited by examiner

MODULAR BED RAIL SYSTEM

TECHNICAL FIELD

This disclosure relates generally to a modular truck bed system with channel rails that receive slidable accessory members, and relates more specifically to a modular system where the slidable accessory members can be selectively attached and detached from the rails to provide a plurality of different bed configurations.

BACKGROUND

Vehicles transport various types of cargo. A user can, for example, rely on a vehicle to transport accessories, such as boxes, containers, and tools to and from a jobsite. The accessories that need to be transported can vary based on the tasks the user performs at the jobsite. Providing different support configurations within a cargo area to accommodate the various accessories can be challenging.

SUMMARY

A system according to an exemplary aspect of the present disclosure includes, among other things: a first rail extendable along a first side wall defining a cargo area; a second rail extendable along a second side wall defining a cargo area, and wherein the first rail and the second rail each define a channel that is closed at one end by a base surface and is open to the cargo area at an opposite end; and a plurality of accessories that are selectively mountable to at least one of the first rail and the second rail, wherein each accessory has a common base structure that is received within the channel.

In a further non-limiting embodiment of any of the systems, the first rail and the second rail extend in a longitudinal direction and the first side wall and the second side wall extend in a vertical direction, and wherein the base surface extends at an angle that is non-parallel and non-perpendicular to a vertical axis extending in the vertical direction.

In a further non-limiting embodiment of any of the systems, the base surface extends at a forty-five degree angle relative to the vertical axis.

In a further non-limiting embodiment of any of the systems, the common base structure has a planar end surface that is parallel to the base surface when installed in the channel.

In a further non-limiting embodiment of any of the systems, each accessory comprises a body portion extending from the common base structure in a lateral direction toward the cargo area, and wherein the body portion includes a first surface extending from one edge of the planar end surface to a distal end surface that extends to an opposite edge of the planar end surface, and wherein the distal end surface is perpendicular to the first surface, and wherein the planar end surface extends transversely relative to the distal end surface and the first surface.

In a further non-limiting embodiment of any of the systems, the plurality of accessories comprise accessories that each have an operational characteristic that is different from other accessories, and wherein each accessory comprises an operational portion that is associated with the distal end surface and provides a desired operational characteristic.

In a further non-limiting embodiment of any of the systems, the operational portion comprises at least one of a tie down, a cleat, a framing connector, a ratchet, a light, a camera, a speaker, a lock box, an acro diffuser.

In a further non-limiting embodiment of any of the systems, the system includes a slider body extending outwardly of the planar end surface of the common base structure, wherein the slider body is receivable for sliding movement along a length of the channel, and wherein the body portion is receivable in the channel in a first position where the first surface is generally parallel to a bottom surface of the cargo area and the distal end surface is generally parallel to the vertical direction and in a second position where the first surface is generally parallel to the vertical direction and the distal end surface is generally parallel to the bottom surface of the cargo area.

In a further non-limiting embodiment of any of the systems, the first side wall is defined by a first top edge and a first inner surface that extends in a vertical direction from the first top edge to a bottom surface of the cargo area, and wherein the second side wall is defined by a second top edge and a second inner surface that extends in the vertical direction from the second top edge to the bottom surface of the cargo area, and wherein the first rail is mounted to the first inner surface and the second rail is mounted to the second inner surface.

In a further non-limiting embodiment of any of the systems, the first side wall and the second side wall each are defined by a length that extends from a forward end of the cargo area to a rearward end of the cargo area, and wherein the first rail extends along an entirety of the length of the first side wall and the second rail extends along an entirety of the length of the second side wall.

In a further non-limiting embodiment of any of the systems, the channel is further defined by a first channel wall portion extending away from one edge of the base surface, a second channel wall portion extending away from an opposite edge of the base surface, a third channel wall portion that extends parallel to the base surface from a distal end of the first channel wall portion, and a fourth channel wall portion that extends parallel to the base surface from a distal end of the second channel wall portion in a direction toward the third channel wall portion, and wherein distal ends of the third channel wall portion and the fourth channel wall portion are spaced apart by an open gap such that a cross-section of the channel forms a C-shape.

In a further non-limiting embodiment of any of the systems, the system includes a side wall insert that extends along an entirety of a length of each of the first side wall and the second side wall in a longitudinal direction, wherein the side wall insert comprises a profile extending in a vertical direction that includes an upper portion that receives the channel and a lower portion that covers a wheel well area.

In a further non-limiting embodiment of any of the systems, the upper portion has an angled surface that extends transversely relative to the vertical direction, and wherein the lower portion defines a raised support surface that is parallel to a bottom surface of the cargo area and extends in the longitudinal direction, and wherein the channel is fit into a recess formed in the angled surface of each side wall insert.

In a further non-limiting embodiment of any of the systems, there is a constant vertical cross-section along a length of each side wall insert.

In a further non-limiting embodiment of any of the systems, there is a constant width of the cargo area between side wall inserts at the first side wall and the second side wall along each corresponding portion of the side wall insert.

In a further non-limiting embodiment of any of the systems, the first rail and the second rail extend in a longitudinal direction and the first side wall and the second side wall extend in a vertical direction, and wherein each accessory comprises a body portion extending to a distal end surface to which an operational portion of the accessory is attached, and wherein each accessory is receivable in the channel in a first position where the distal end surface is generally parallel to the vertical direction and in a second position where the distal end surface is generally parallel to a bottom surface of the cargo area.

In a further non-limiting embodiment of any of the systems, the plurality of accessories include a plurality of operational portions that include at least a first operational portion that comprises a tie down, a second operational portion that comprises a cleat, a third operational portion that comprises a framing connector, a fourth operational portion that comprises a ratchet, a fifth operational portion that comprises a light, a sixth operational portion that comprises a camera, a seventh operational portion that comprises a speaker, an eight operational portion that comprises a lock box, and a ninth operational portion that comprises an aero diffuser.

An assembly according to an exemplary aspect of the present disclosure includes, among other things: a first side wall extending along a length of a cargo area in a longitudinal direction; a second side wall extending along the length of the cargo area and facing the first side wall; a first side wall insert that extends along the length of the first side wall; a second side wall insert that extends along the length of the second side wall; and wherein each side wall insert comprises an outer profile surface extending in a vertical direction from an upper edge of a respective one of the first side wall and the second side wall to a bottom surface of the cargo area, and wherein there is a constant vertical cross-section along a length of each side wall insert.

In a further non-limiting embodiment of any of the assemblies, each side wall insert includes an upper portion that receives a channel associated with a plurality of selectively installable accessories and a lower portion that covers a wheel well area and provides a laterally extending support surface.

A method according to an exemplary aspect of the present disclosure includes, among other things: extending a first rail along a first side wall defining a cargo area; extending a second rail along a second side wall defining a cargo area, wherein the first rail and the second rail each define a channel that is closed at one end by a base surface and is open to the cargo area at an opposite end; and selectively mounting one or more of a plurality of accessories to at least one of the first rail and the second rail, wherein each accessory has a common base structure that is received within the channel.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a modular truck bed system with channel rails on each side of the bed that receive slidable accessory members. In this modular system, the slidable accessory members can be selectively attached and detached from the rails to provide a plurality of different bed configurations.

Figure 1:
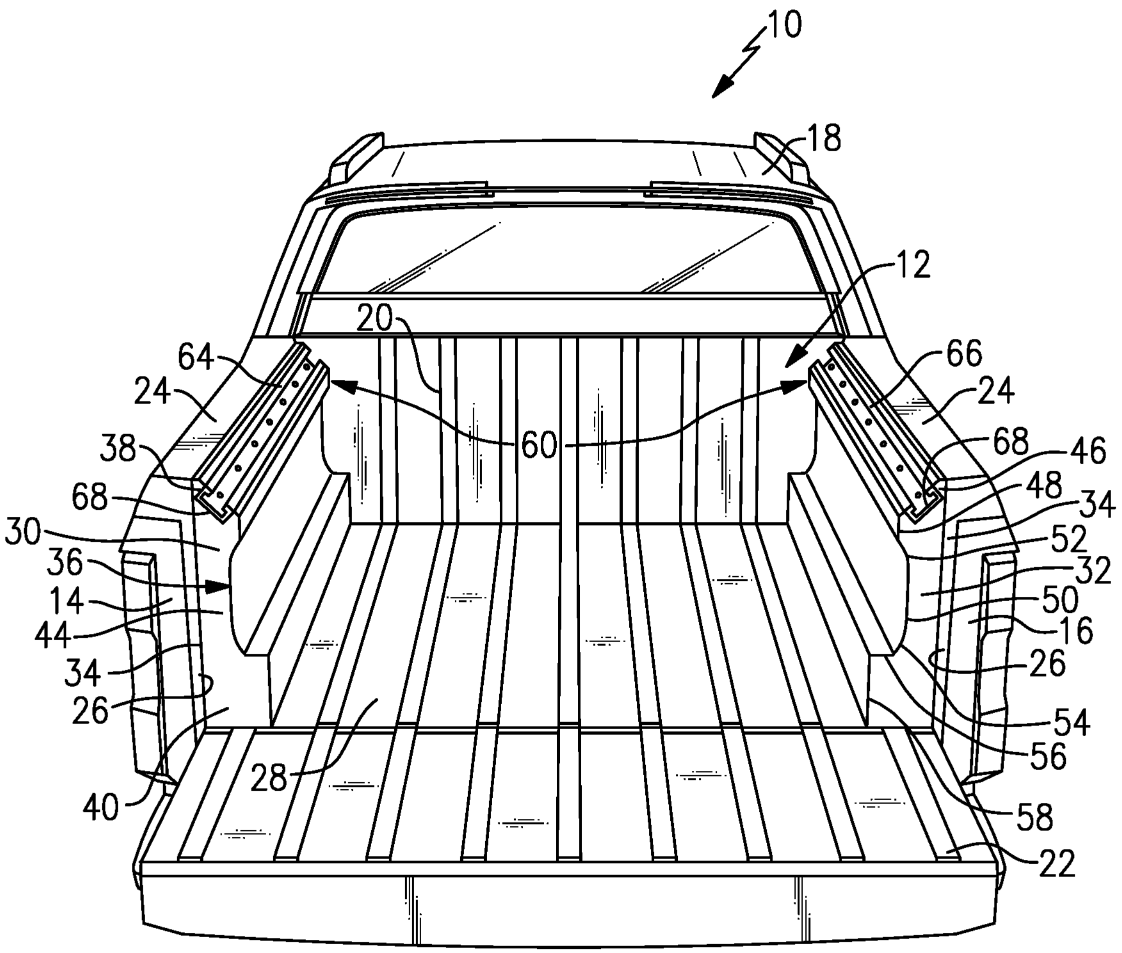
FIG. 1 illustrates a rear view of a truck bed with a modular channel rail system configured to support accessories.

FIG. 1 shows a vehicle 10 with a cargo area 12 defined by a first side wall 14 and a second side wall 16 facing opposite the first side wall 14. A passenger cab 18 is at a front of the vehicle and a front bed wall 20 extends along a back of the passenger cab 18 between the first side wall 14 and the second side wall 16 to enclose a front end of the cargo area 12. A tailgate 22 is positioned at a rear of the vehicle 10 and is moveable between an open position and a closed position as known. FIG. 1 shows the tailgate 22 in the open position, and when the tailgate 22 is moved to the closed position a rear wall of the cargo area 12 is provided.

The first side wall 14 and the second side wall 16 extend along a length of the cargo area 12 in a longitudinal direction, e.g., along a length of the vehicle 10. Each of the first side wall 14 and the second side wall 16 include a top edge or top surface 24 and an inner wall surface 26 that faces the cargo area 12. A bottom bed surface 28 extends in a lateral direction, e.g., across a width of the vehicle 10, between the inner wall surfaces 26 of the first side wall 14 and the second side wall 16. The bottom bed surface 28 also extends in the longitudinal direction from the front bed wall 20 to the tailgate 22.

In one example, a first side wall insert 30 is attached directly to the inner wall surface 26 of the first side wall 14 and a second side wall insert 32 is attached directly to the inner wall surface 26 of the second side wall 16. In one example, the first side wall insert 30 extends along a length of the first side wall 14 and the second side wall insert 32 extends along a length of the second side wall 16. In one example, the first 30 and second 32 side wall inserts extend along an entirety of the lengths of the first side wall 14 and the second side wall 16, leaving only enough inner wall surface area 34 open to accommodate the tailgate 22 when in the closed position.

In one example, each side wall insert 30, 32 comprises an extruded bed design that provides consistent geometry across the cargo area 12. Those skilled in the art who have the benefit of this description will be able to determine the appropriate extrusion method and material that could be applied for these purposes. Additionally, other types of forming processes, such as various molding techniques, could also be used to form each side wall insert 30, 32.

Figure 8:
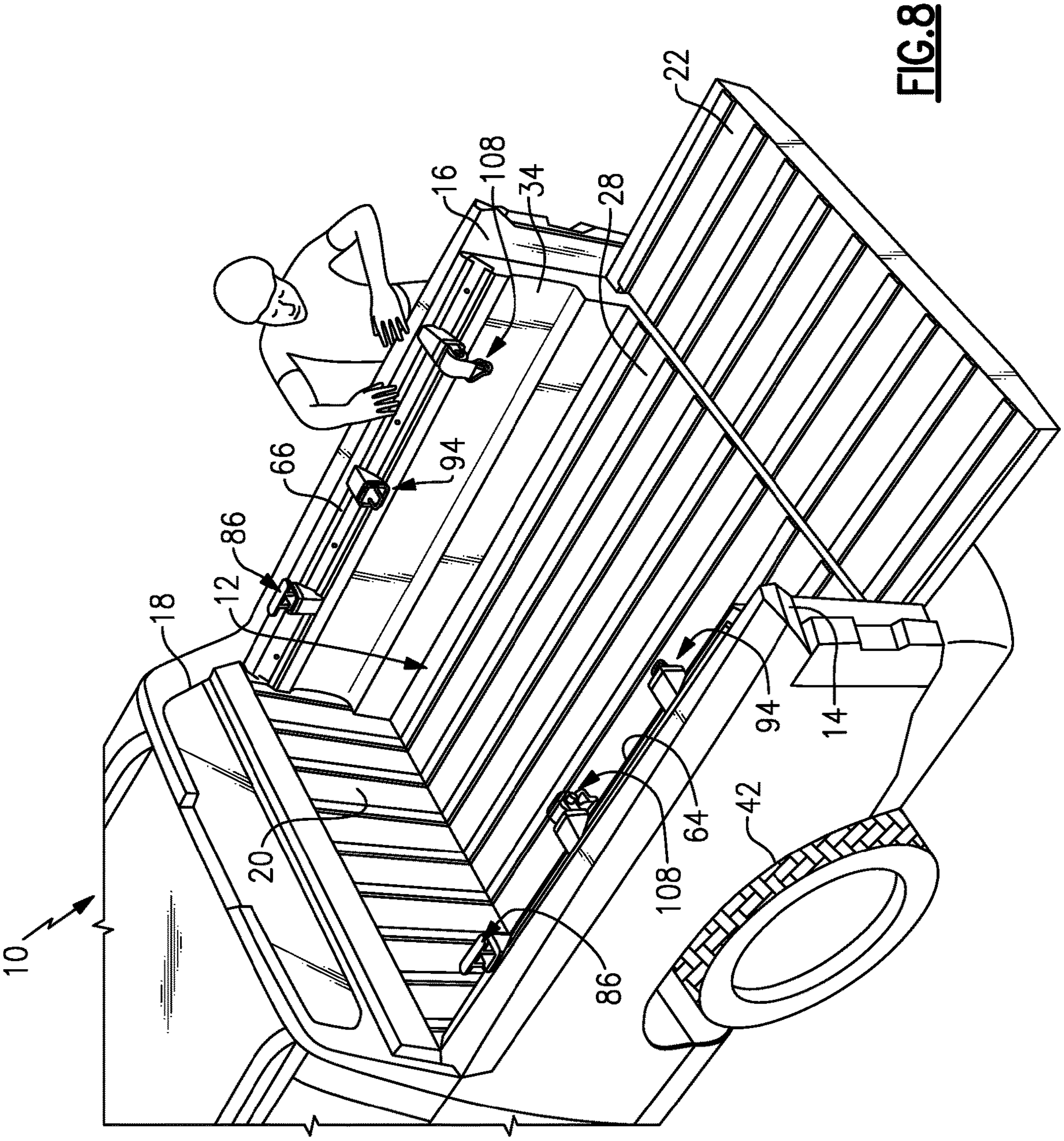
FIG. 8 is a rear perspective view of a truck bed with different types of accessories as installed in the modular channel rail system.

In one example, each side wall insert 30, 32 comprises an outer profile surface 36 that extends in a vertical direction, e.g., along a height of the vehicle 10, from the upper edges 24 of the first 14 and second 16 side walls to the bottom bed surface 28 of the cargo area 12. In one example, each side wall insert 30, 32 includes an upper portion 38, a lower portion 40 that covers a wheel well area 42 (see FIG. 8), and a middle portion 44 that extends between the upper 38 and lower 40 portions. In one example, the upper portion 38 includes a first surface 46 having a width that extends in the lateral direction and a length that extends in the longitudinal direction, and the first surface 46 extends transversely to a plane defining the vertical direction. The upper portion 38 further includes a second surface 48 that transitions downwardly from the first surface 46 to the middle portion 44. In one example, the first surface 46 comprises an angled surface that is neither parallel to nor perpendicular to the top surface 24, and is neither parallel to nor perpendicular to the inner wall surface 26. In one example, the angled surface extends at a forty-five degree angle. In one example, the second surface 48 is parallel to the vertical direction, and is generally parallel to the inner wall surface 26.

In one example, the middle portion 44 comprises third surface 50, which is generally parallel to the inner wall surface 26, a first transition surface 52, and a second transition surface 54. The first transition surface 52 transitions from the second surface 48 to the third surface 50. The second transition surface 54 transitions from the third surface 50 to the lower portion 40. In one example, the first 52 and second 54 transition surfaces are curved profiles.

In one example, the lower portion 40 comprises a fourth surface 56 and a fifth surface 58 that extends down to the bottom bed surface 28 to complete the outer profile surface 36. In one example, the fourth surface 56 comprises a laterally extending support surface that extends inwardly from the second transition surface 54 in a direction toward the cargo area 12. In one example, the laterally extending support surface 56 is generally parallel to the bottom bed surface 28 and is spaced upward from the bottom bed surface 28. This laterally extending support surface can be used to support a raised floor bed member (not shown), for example. In one example, the fifth surface 58 extends parallel to the vertical direction and extends from the fourth surface 56 to the bottom bed surface 28.

In this example, the outer profile surface 36 comprises, in a direction from top to bottom: the first surface 46; the second surface; 48, the first transition surface 52; the third surface 50; the second transition surface 54; the fourth surface 56; and the fifth surface 58.

In one example, a thickness of each side wall insert 30, 32 varies along a vertical height of the inserts 30, 32. In one example, the thickness at the third surface 50 is less than the thickness at the second surface 48 and less than the thickness at the fifth surface 58.

In one example, the greatest thickness is at the fifth surface 58.

In one example, the smallest thickness is at the third surface 50.

In one example, there is a constant vertical cross-section of each side wall insert 30, 32 along a longitudinal length of each side wall insert 30, 32. In one example, there is a constant width of the cargo area 12 between the side wall inserts 30, 32 and along the longitudinal length of the cargo area 12. This configuration addresses issues raised by wheel well areas and provides for a constant and consistent geometry throughout the cargo area 12.

Figure 2:
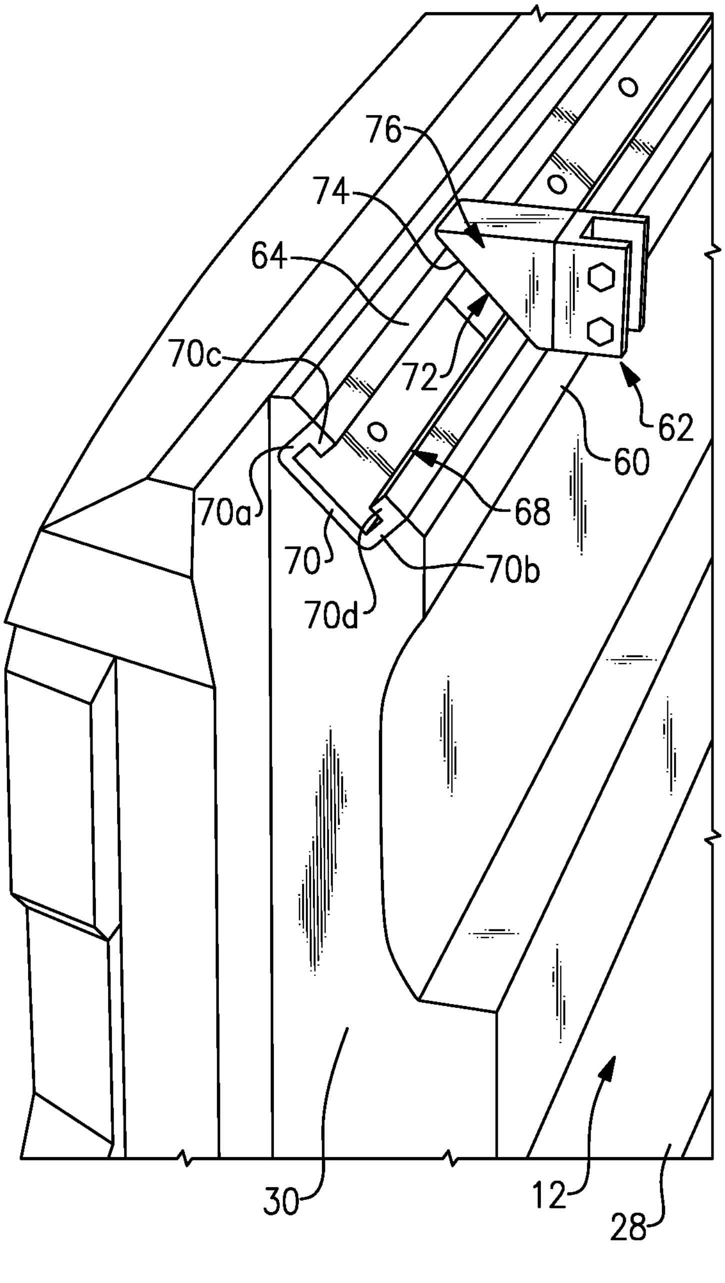
FIG. 2 is a perspective enlarged view of one end of a channel rail with an accessory attached.

As discussed above, the subject disclosure provides for a modular truck bed system 60 with channel rails that are located on each side of the bed that receive slidable accessory members 62 (FIG. 2). In one example, a first rail 64 extends along the first side wall 14 and a second rail 66 extends along the second side wall 16 in the longitudinal direction. The rails 64, 66 can be directly attached to the side walls 14, 16, or the rails 64, 66 can be associated with the upper portion 38 of the inserts 30, 32 as shown in FIG. 1. In one example, the first rail 64 and the second rail 66 are fastened to the inserts 30, 32; however, the rails 64, 66 could also be molded together with the inserts 30, 32. In one example, the first rail 64 extends along a substantial entirety of the length of the first side wall 14 and the second rail 66 extends along a substantial entirety of the length of the second side wall 16.

In one example shown in FIG. 2, the first rail 64 and the second rail 66 each define a channel 68 that is closed at one end by a base surface 70 and is open to the cargo area 12 at an opposite end. A plurality of accessories 62 are selectively mountable to at least one of the first rail 64 and the second rail 66, wherein each accessory 62 has a common base structure 72 that is received within the channel 68.

In one example, the base surface 70 of the channel 68 extends at an angle that is non-parallel and non-perpendicular to the vertical axis extending in the vertical direction. The base surface 70 also extends transversely to inner surface 26 of the side walls 14, 16 and extends transversely to the top surface 24. In one example, the base surface 70 extends at a forty-five degree angle relative to the vertical axis.

In one example shown in FIG. 2, the channel 68 is further defined by a first channel wall portion **70*a* extending away from one edge of the base surface 70, a second channel wall portion 70*b* extending away from an opposite edge of the base surface 70, a third channel wall portion 70*c* that extends parallel to the base surface 70 from a distal end of the first channel wall portion 70*a*, and a fourth channel wall portion 70*d* that extends parallel to the base surface 70 from a distal end of the second channel wall portion 70*b* in a direction toward the third channel wall portion 70*c*. In this example, distal ends of the third channel wall portion 70*c* and the fourth channel wall portion 70*d* are spaced apart by an open gap such that a cross-section of the channel 68** forms a C-shape.

In one example, the common base structure 72 has a planar end surface 74 that is parallel to the base surface 70 when installed in the channel 68 as shown in FIG. 2. In one example, the common base structure 72 of each accessory 62 further comprises a body portion 76 extending from the common base structure 72 in a lateral direction toward the cargo area 12. The body portion 76 includes a first surface 78 extending from one edge of the planar end surface to a distal end surface 80 that extends to an opposite edge of the planar end surface 74. In one example, the distal end surface 80 is perpendicular to the first surface 78, and the planar end surface 74 extends transversely relative to the distal end surface 80 and the first surface 78. In one example, a pair of side walls 82 extend between the planar end surface 74, the first surface 78, and the distal end surface 80 to form a triangular shaped body portion 76.

The plurality of accessories 62 comprise various unique accessories that each have an operational characteristic that is different from other accessories. In one example, each accessory 62 comprises an operational portion 84 that is associated with the distal end surface 80 of the body portion 76 and provides a desired operational characteristic. For example, the operational portion 84 comprises at least one of a tie down, a cleat, a framing connector, a ratchet, a light, a camera, a speaker, a lock box, an acro diffuser. Examples of these variations are shown in FIGS. 3A-3I.

Figures 3A, 3B, 3C, 3D, 3E, 3F, 3G, 3H, 3I:
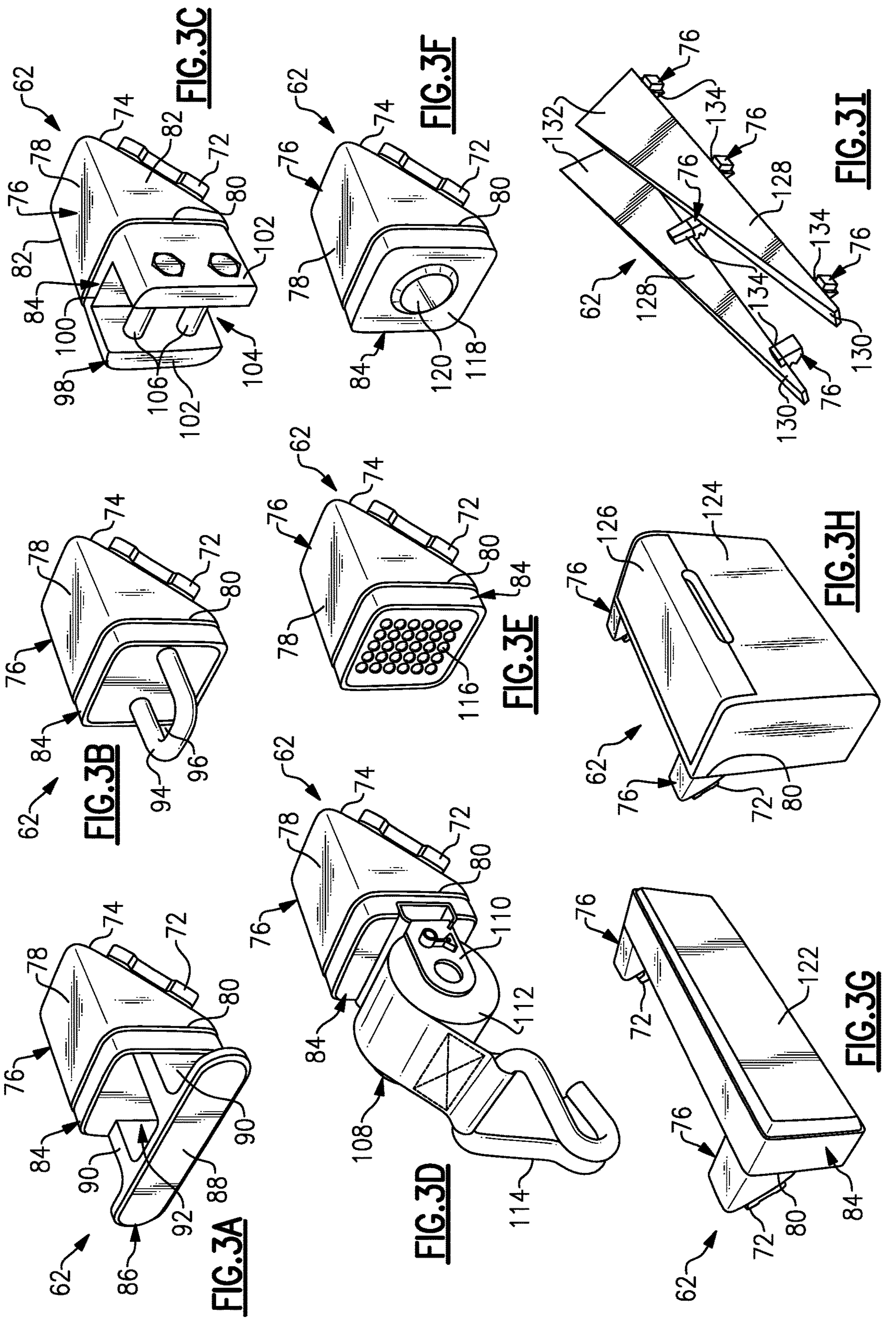
FIG. 3A is a perspective view of one type of accessory.
FIG. 3B is a perspective view of another type of accessory.
FIG. 3C is a perspective view of another type of accessory.
FIG. 3D is a perspective view of another type of accessory.
FIG. 3E is a perspective view of another type of accessory.
FIG. 3F is a perspective view of another type of accessory.
FIG. 3G is a perspective view of another type of accessory.
FIG. 3H is a perspective view of another type of accessory.
FIG. 3I is a perspective view of another type of accessory.

FIG. 3A shows one example of an operational portion 84 that comprises a cleat 86 with a tie-down option. The cleat 86 comprises a straight body bar portion 88 with legs 90 that extend back toward the body portion 76 to form an opening 92 for a rope or strap, for example.

FIG. 3B shows one example of an operational portion 84 that comprises a tie-down 94. The tie-down 94 comprises a looped body that forms an opening 96 for a rope or strap, for example.

FIG. 3C shows one example of an operational portion 84 that comprises a framing connector 98, e.g. a 2×4 connector. FIG. 2 shows one example of the framing connector 98 in one installed position. In one example, the framing connector 98 comprises a base 100 with a pair of legs 102 extending away opposing edges of the base 100 to provide an open-ended recess 104. One or more fasteners 106 extend through aligned openings in the legs 102 and across the recess 104. The fasteners 106 are use to secure boards of various sizes, e.g. a 2×4 board, to the body portion 76. This will be discussed in greater detail below.

FIG. 3D shows one example of an operational portion 84 that comprises a ratchet 108. In one example, the ratchet 108 comprises a fixed support 110 around which a strap 112 is wound, with a distal end of the strap 112 including a hook or other similar type of catching or grasping element 114.

FIG. 3E shows one example of an operational portion 84 that comprises a light 116. In one example, the light 116 comprises one or more LED or other types of light sources.

FIG. 3F shows one example of an operational portion 84 that comprises camera 118.

In one example, the camera 118 comprises one or more lenses 120 that can be used to view a certain area.

FIG. 3G shows one example of an operational portion 84 that comprises speaker 122. In one example, the speaker 122 comprises a Bluetooth® speaker.

FIG. 3H shows one example of an operational portion 84 that comprises a cargo lock box 124. In one example, the lock box 124 includes a lid 126 that is moveable between open and closed positions to provide access to stored items located within the box 124.

FIG. 3I shows one example of an operational portion 84 that comprises aero diffusers 128. In one example, the aero diffusers 128 are triangular shaped bodies that are positioned at each longitudinal side of the cargo area 12 and extend upwardly of the top edge 24. In one example, the narrowest portion 130 of the triangular shaped body is located near the passenger cab 18 with a widest portion 132 of the triangular shaped body being near the tailgate 22. As shown in FIG. 3I, more than one body portion 76 may be needed to secure the aero diffusers 128 to the rails 64, 66. As such, the aero diffusers 128 may include a plurality of attachment points 134 for body portions 76. The aero diffusers 128, when installed, provide for better aerodynamic efficiency for the vehicle 10.

Figure 4:
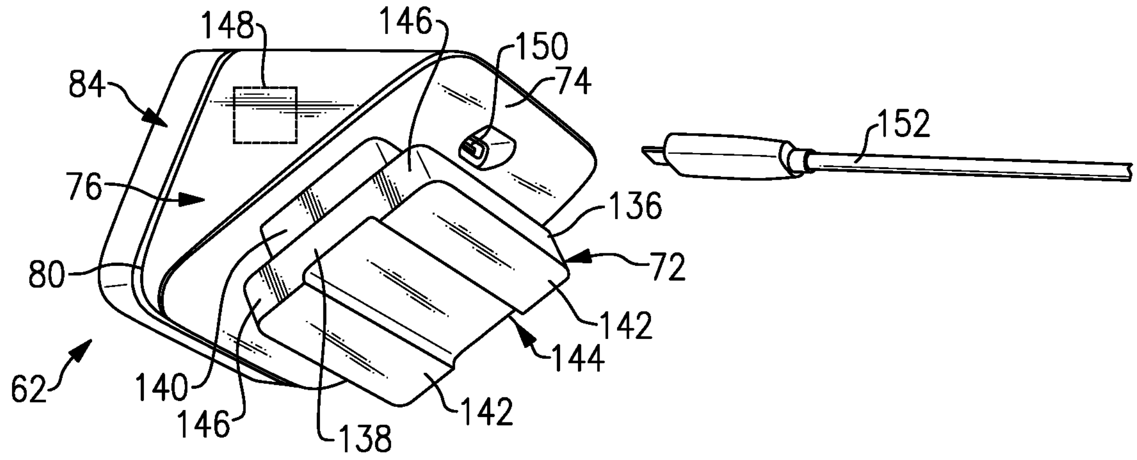
FIG. 4 is a bottom perspective view of a sliding body associated with an accessory.

In one example, the common base structure 72 for each accessory comprises a slider body 136 as shown in FIG. 4. The slider body 136 extends outwardly of the planar end surface 74 and is receivable in each rail for sliding movement along a length of the channel 68. In one example, the slider body 136 comprises a base portion 138, a narrowing neck portion 140, and a pair of legs 142 located on opposing sides of the base portion 138. The narrowing neck portion connects a center of one side of the base portion 138 to the planar end surface 74. One leg 142 extends downwardly from an opposite side of the base portion 138 from one edge of the base portion 138. The other leg 142 extends from the base portion 138 from an opposite edge of the base portion 138. In one example, distal ends of the legs 142 are spaced apart from each other by a gap 144. As the neck portion 140 has a smaller width than an overall width of the base portion 138, flanges 146 are formed that are received within opposing grooves of the channel 68. The grooves are formed by the base surface 70, the second channel wall portion 70*b*, the third channel wall portion 70*c*, and the fourth channel wall portion 70*d* (see FIG. 2).

In one example, an accessory 62 can include an internal battery 148 housed within the body portion 76. The body portion 76 can include a charging inlet 150 that can mate with a charging cord 152 to power a device with the battery 148.

Figure 5:
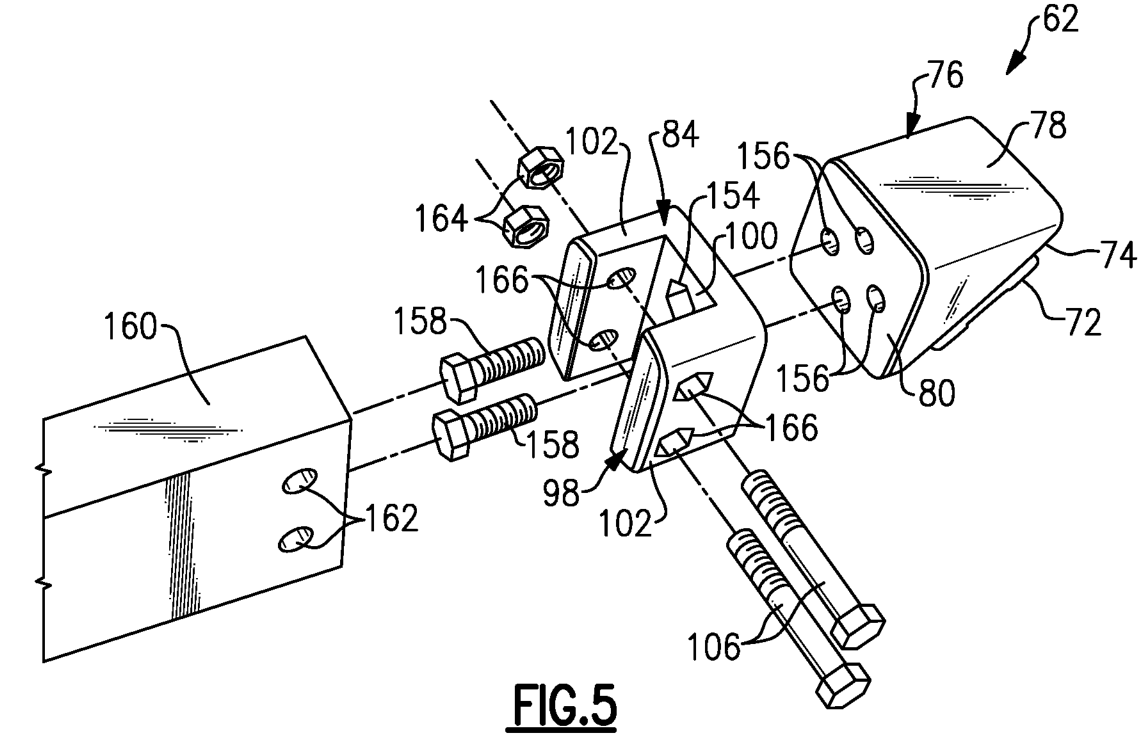
FIG. 5 is an exploded view of a framing connector accessory.

In one example, the body portion 76 of the accessory 62 can be installed to provide a plurality of different mounting orientations when installed in the rails 64, 66. For example, the framing connector 98 of FIG. 3C is configured to provide at least four different orientations. FIG. 5 shows the framing connector 98 in greater detail. In this example, the base 100 includes a pair of holes 154 (only one is shown) that can be aligned with holes 156 formed in the distal end surface 80 of the body portion 76. In the example shown, the distal end surface 80 includes four holes 156. A pair of fasteners 158 are then used to secure the base 100 to the body portion 76. FIG. 5 shows alignment between the holes 154 of the base 100 with one pair of holes 156 of the body portion. This provides for one orientation. However, the base 100 can be rotated ninety degrees from the position shown in FIG. 5 such that the holes 154 of the base 100 are aligned with the other pair of holes 156 in the body portion 76. This provides for a second orientation of the base 100 to the body portion 76. Once the desired orientation is selected, the fasteners 158 are used to secure the framing connector 98 to the body portion 76.

Next, one end of a framing member 160, e.g., a 2×4 board, is inserted into the open-ended recess 104. Markings can be made on the end of the board, the end can be removed, and then holes 162 can be subsequently drilled through the board. The end of the board can then be reinserted into the recess 104 and the fasteners 106 can be installed through aligned openings 166 in the legs 102 and the openings 162 in the board, and anchor nuts 164 can be installed on ends of the fasteners 106 to secure the board to the body portion 76.

Figure 6:
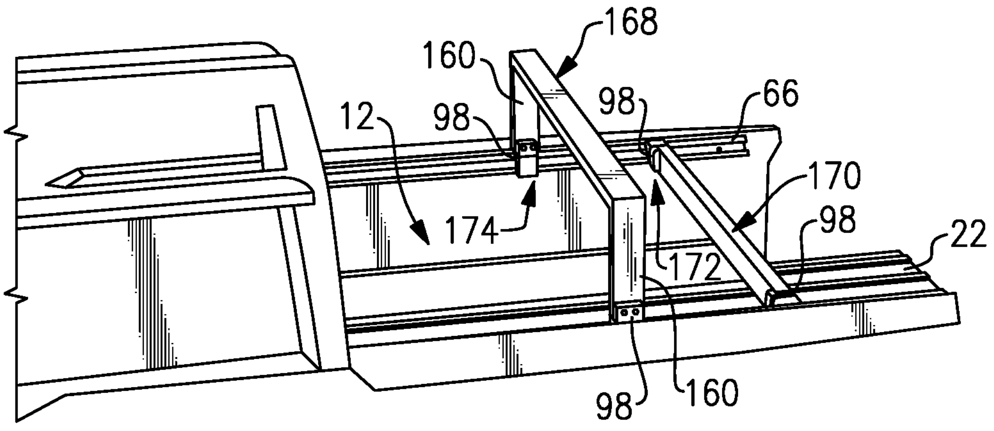
FIG. 6 is a side perspective view of accessories as installed in the modular channel raid system.

As shown in FIG. 6, multiple accessories 62 comprising framing connectors 98 can be used to form any type of frame structure 168. Additionally, dividing structures 170 can also be provided by using framing connectors 98.

Further, in additional to the two different orientations discussed above, two additional orientations are provided for the accessories 62. For example, the body portion 76 of the framing connector 98 can be received in the channel 68 in a first position where the first surface 78 is generally parallel to a bottom surface 28 of the cargo area 12 and the distal end surface 80 is generally parallel to the vertical direction. This configuration would correspond generally to an orientation shown in FIG. 5 and as installed in the rail 66 as indicated at 172 in FIG. 6. The body portion 76 could also be rotated from the position shown at 172 to a second position where the first surface 78 is generally parallel to the vertical direction and the distal end surface 80 is generally parallel to the bottom surface 28 of the cargo area 12. This configuration would correspond generally to an orientation shown in FIG. 7 and as installed in the rail 66 as indicated at 174 in FIG. 6.

Figure 7:
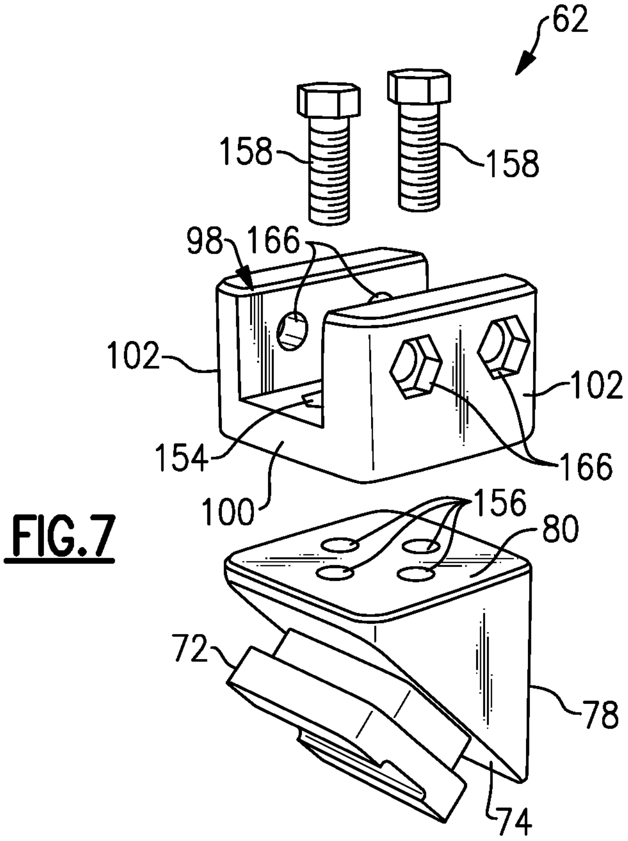
FIG. 7 is an exploded view of a framing connector accessory.

FIG. 7 shows a configuration where multiple different types of accessories can be installed on the rails 64, 66 at the same time. Any of the accessories shown in FIGS. 3A-3I can be installed in any number, and in any combination, within the rails 64, 66. FIG. 7 shows an example where a pair of cleats 86 with a tie-down option are installed at a forward location, a first tie-down 94 is installed to face a first ratchet 108 at a middle location, and a second tie-down 94 is installed to face a second ratchet 108 at a rear location.

The modular truck bed system 60 provides a full length rail configuration that extends through to the rearmost pillar of the vehicle, e.g., to the end of the truck bed, and utilizes a 45 degree angle of rail to support building in the horizontal and vertical directions. The system also uses slide in accessories 62 such that the rails do not need to be removed for accessories to be added or changed. The system also provides a simplified bed design that allows accessories to slide with consistent "extruded-like" geometry. Further, when the tailgate 22 is in the raised position, the accessories are "locked" in the sense that they cannot be removed from the rails. When the tailgate 22 is lowered, the accessories 62 can then be easily removed from the rails.

It should be understood that while the vehicle in this example comprises a pickup truck, the disclosed modular rail system could also be used in cargo areas of other vehicle types such as vans, SUVs, cars, etc.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A system, comprising:

a first rail extendable along a first side wall defining a cargo area;

a second rail extendable along a second side wall defining a cargo area, and wherein the first rail and the second rail each define a channel that is closed at one end by a base surface and is open to the cargo area at an opposite end;

a plurality of accessories that are selectively mountable to at least one of the first rail and the second rail, wherein each accessory has a common base structure that is received within the channel, wherein the common base structure comprises a slider portion and a body portion that is held fixed to the slider portion; and wherein the body portion has a planar end surface that is parallel to the base surface and an accessory support surface facing opposite of the planar end surface that is non-parallel to the planar end surface when installed in the channel.

2. The system of claim 1, wherein the first rail and the second rail extend in a longitudinal direction and the first side wall and the second side wall extend in a vertical direction, and wherein the base surface extends at an angle that is non-parallel and non-perpendicular to a vertical axis extending in the vertical direction.

3. The system of claim 2, wherein the base surface extends at a forty-five degree angle relative to the vertical axis.

4. The system of claim 1, wherein the first side wall is defined by a first top edge and a first inner surface that extends in a vertical direction from the first top edge to a bottom surface of the cargo area, and wherein the second side wall is defined by a second top edge and a second inner surface that extends in the vertical direction from the second top edge to the bottom surface of the cargo area, and wherein the first rail is mounted to the first inner surface and the second rail is mounted to the second inner surface.

5. The system of claim 4, wherein the first side wall and the second side wall each are defined by a length that extends from a forward end of the cargo area to a rearward end of the cargo area, and wherein the first rail extends along an entirety of the length of the first side wall and the second rail extends along an entirety of the length of the second side wall.

6. The system of claim 1, wherein the channel is further defined by a first channel wall portion extending away from one edge of the base surface, a second channel wall portion extending away from an opposite edge of the base surface, a third channel wall portion that extends parallel to the base surface from a distal end of the first channel wall portion, and a fourth channel wall portion that extends parallel to the base surface from a distal end of the second channel wall portion in a direction toward the third channel wall portion, and wherein distal ends of the third channel wall portion and the fourth channel wall portion are spaced apart by an open gap such that a cross-section of the channel forms a C-shape.

7. The system of claim 1, wherein the slider portion is non-rotatable relative to the body portion.

8. A system, comprising:

a first rail extendable along a first side wall defining a cargo area;

a second rail extendable along a second side wall defining a cargo area, and wherein the first rail and the second rail each define a channel that is closed at one end by a base surface and is open to the cargo area at an opposite end;

the first rail and the second rail extend in a longitudinal direction and the first side wall and the second side wall extend in a vertical direction, and wherein the base surface extends at an angle that is non-parallel and non-perpendicular to a vertical axis extending in the vertical direction:

a plurality of accessories that are selectively mountable to at least one of the first rail and the second rail, wherein each accessory has a common base structure that is received within the channel, and wherein the common base structure has a planar end surface that is parallel to the base surface when installed in the channel; and wherein each accessory comprises a body portion extending from the common base structure in a lateral direction toward the cargo area, and wherein the body portion includes a first surface extending from one edge of the planar end surface to a distal end surface that extends to an opposite edge of the planar end surface, and wherein the distal end surface is perpendicular to the first surface, and wherein the planar end surface extends transversely relative to the distal end surface and the first surface.

9. The system of claim 8, wherein the plurality of accessories comprise accessories that each have an operational characteristic that is different from other accessories, and wherein each accessory comprises an operational portion that is associated with the distal end surface and provides a desired operational characteristic.

10. The system of claim 9, wherein the operational portion comprises at least one of a tie down, a cleat, a framing connector, a ratchet, a light, a camera, a speaker, a lock box, an aero diffuser.

11. The system of claim 8, including a slider body extending outwardly of the planar end surface of the common base structure, wherein the slider body is receivable for sliding movement along a length of the channel, and wherein the body portion is receivable in the channel in a first position where the first surface is generally parallel to a bottom surface of the cargo area and the distal end surface is generally parallel to the vertical direction and in a second position where the first surface is generally parallel to the vertical direction and the distal end surface is generally parallel to the bottom surface of the cargo area.

12. A system, comprising:

a first rail extendable along a first side wall defining a cargo area;

a second rail extendable along a second side wall defining a cargo area, and wherein the first rail and the second rail each define a channel that is closed at one end by a base surface and is open to the cargo area at an opposite end;

a plurality of accessories that are selectively mountable to at least one of the first rail and the second rail, wherein each accessory has a common base structure that is received within the channel; and a side wall insert that extends along an entirety of a length of each of the first side wall and the second side wall in a longitudinal direction, wherein the side wall insert comprises a profile extending in a vertical direction that includes an upper portion that receives the channel and a lower portion that covers a wheel well area.

13. The system of claim 12, wherein the upper portion has an angled surface that extends transversely relative to the vertical direction, and wherein the lower portion defines a raised support surface that is parallel to a bottom surface of the cargo area and extends in the longitudinal direction, and wherein the channel is fit into a recess formed in the angled surface of each side wall insert.

14. The system of claim 13, wherein there is a constant vertical cross-section along a length of each side wall insert.

15. The system of claim 12, wherein there is a constant width of the cargo area between side wall inserts at the first side wall and the second side wall along each corresponding portion of the side wall insert.

16. A system, comprising:

a first rail extendable along a first side wall defining a cargo area;

a second rail extendable along a second side wall defining a cargo area, and wherein the first rail and the second rail each define a channel that is closed at one end by a base surface and is open to the cargo area at an opposite end;

a plurality of accessories that are selectively mountable to at least one of the first rail and the second rail, wherein each accessory has a common base structure that is received within the channel; and wherein the first rail and the second rail extend in a longitudinal direction and the first side wall and the second side wall extend in a vertical direction, and wherein each accessory comprises a body portion extending to a distal end surface to which an operational portion of the accessory is attached, and wherein each accessory is receivable in the channel in a first position where the distal end surface is generally parallel to the vertical direction and in a second position where the distal end surface is generally parallel to a bottom surface of the cargo area.

17. The system of claim 16, wherein the plurality of accessories include a plurality of operational portions that include at least a first operational portion that comprises a tie down, a second operational portion that comprises a cleat, a third operational portion that comprises a framing connector, a fourth operational portion that comprises a ratchet, a fifth operational portion that comprises a light, a sixth operational portion that comprises a camera, a seventh operational portion that comprises a speaker, an eight operational portion that comprises a lock box, and a ninth operational portion that comprises an aero diffuser.

18. An assembly comprising:

a first side wall extending along a length of a cargo area in a longitudinal direction;

a second side wall extending along the length of the cargo area and facing the first side wall;

a first side wall insert that extends along the length of the first side wall;

a second side wall insert that extends along the length of the second side wall;

wherein each side wall insert comprises an outer profile surface extending in a vertical direction from an upper edge of a respective one of the first side wall and the second side wall to a bottom surface of the cargo area, and wherein there is a constant vertical cross-section along a length of each side wall insert; and wherein each side wall insert includes an upper portion that receives a channel associated with a plurality of selectively installable accessories and a lower portion that covers a wheel well area and provides a laterally extending support surface.

19. A method comprising:

extending a first side wall insert along a length of a first side wall defining a cargo area;

extending a second side wall insert along a length of a second side wall defining the cargo area:

extending a first rail along the first side wall insert;

extending a second rail along the second side wall insert, wherein the first rail and the second rail each define a channel that is closed at one end by a base surface and is open to the cargo area at an opposite end;

extending the first side wall insert along an entirety of the length of the first side wall and extending the second side wall insert along an entirety of the length of the second side wall in a longitudinal direction:

forming each of the first side wall insert and second side wall insert to have a profile extending in a vertical direction that includes an upper portion that receives the channel and a lower portion that covers a wheel well area; and selectively mounting one or more of a plurality of accessories to at least one of the first rail and the second rail, wherein each accessory has a common base structure that is received within the channel.

* * * * *